(12) United States Patent
Hida

(10) Patent No.: US 8,714,842 B2
(45) Date of Patent: May 6, 2014

(54) TRIPOD HEAD

(71) Applicant: Heiwa Seiki Kogyo Co., Ltd., Saitama (JP)

(72) Inventor: Nobuyuki Hida, Saitama (JP)

(73) Assignee: Heiwa Seiki Kogyo Co., Ltd, Saitama (JP)

( * ) Notice: Subject to any disclaimer, the term of this patent is extended or adjusted under 35 U.S.C. 154(b) by 0 days.

(21) Appl. No.: 13/686,032

(22) Filed: Nov. 27, 2012

(65) Prior Publication Data

US 2013/0136440 A1    May 30, 2013

(30) Foreign Application Priority Data

Nov. 28, 2011   (JP) .................................. 2011-258852

(51) Int. Cl.
*G03B 17/00* (2006.01)
*H04N 5/225* (2006.01)
*F16M 11/00* (2006.01)

(52) U.S. Cl.
USPC ........ 396/428; 396/421; 348/373; 248/162.1; 248/178.1

(58) Field of Classification Search
USPC .................. 396/428, 419, 421, 427; 348/373; 351/243; 248/177.1, 127, 161, 162.1, 248/404

See application file for complete search history.

(56) References Cited

U.S. PATENT DOCUMENTS

| | | | |
|---|---|---|---|
| 4,989,814 A | * | 2/1991 | Uehara et al. .............. 248/183.3 |
| 2010/0243851 A1 | | 9/2010 | Murrow et al. |

* cited by examiner

*Primary Examiner* — Rochelle-Ann J Blackman
(74) *Attorney, Agent, or Firm* — Wenderoth, Lind & Ponack, L.L.P.

(57) ABSTRACT

A tripod head comprising a resilient force adjusting mechanism which includes a rotating operation part, a cam which is coupled to the rotating operation part and slides with the rotation of the rotating operation part, and a cam follower coming into contact with cam surfaces of the cam, wherein the cam follower is supported by a counterbalancing mechanism, and the counterbalancing mechanism is configured in such a manner that the magnitude of a resilient force to be imparted on the spring is variable in accordance with a position where the cam follower comes into contact with the cam.

7 Claims, 3 Drawing Sheets

TRIPOD HEAD

TECHNICAL FIELD

The present invention relates to a tripod head configured to generate a drag so as to be capable of counterbalancing with a rotation moment generated when a filming apparatus mounted thereon tilts.

BACKGROUND ART

Filming apparatuses such as video cameras and movie cameras are mounted on a tripod via a tripod head. Since the filming apparatuses are required to move within a horizontal plane and a vertical plane so as to follow the movements of an object, the tripod head is integrated with a mechanism to achieve such movements. The tripod head is provided with a drag mechanism for a rotation within a horizontal plane and the drag mechanism and a counterbalancing mechanism for tilting motion in the vertical plane in order to smoothen the moving operation of the filming apparatus. Both of the drag mechanism and the counterbalancing mechanism are configured to achieve the movements of the filming apparatus with a substantially constant operating force.

The counterbalancing mechanism is configured to generate a drag so as to be capable of counterbalancing with a rotation moment generated when the filming apparatus mounted on the tripod head tilts within the vertical plane. A method of generation of the drag is generally on the basis of a spring.

Incidentally, the weights of the filming apparatus are different from one apparatus to another, and hence the counterbalancing mechanism is required to adjust a resilient force that the spring generates to a suitable magnitude corresponding to the weight of the filming apparatus.

In order to cope with such a requirement, a tripod head described in US 2010/0243851 A1 is configured with a parent screw which is rotated by an internal gear to adjust the position of a sliding member with respect to the seat and adjust an initial compression state of the spring so as to accommodate cameras having different weights. The tripod head described in US 2010/0243851 A1 is configured in such a manner that the internal gear rotates via a pinion by a rotating operation of a wheel provided so as to project from a side wall of a lower housing.

BRIEF SUMMARY OF THE INVENTION

However, the tripod head described in US 2010/0243851 A1 has a problem in that although the operating force required for rotating the wheel can be alleviated to some extent by setting gear ratio, the amount of rotation of the wheel is increased. In addition, there is also a problem that around the final turn of the wheel, since a resilient force is accumulated in the spring, the operating force required for rotating the wheel is increased. Such an increase in the amount of rotation and the operating force of the wheel put a burden on an operator of the filming apparatus.

In view of such circumstances, it is an object of the invention to provide a tripod head which is capable of alleviating a burden of operation generated when a resilient force is imparted in advance to a spring provided on a counterbalancing mechanism.

In order to solve the above-described problem, there is provided a tripod head of the invention including: a mounting which is tiltable and allows a filming apparatus to be mounted thereon, a counterbalancing mechanism having a spring and configured to generate a resilient force on the spring so as to be capable of counterbalancing with a rotation moment generated when the filming apparatus to be mounted on the mounting tilts, and a resilient force adjusting mechanism configured to accommodate the weight of the filming apparatus to be mounted on the mounting and impart a resilient force in advance on the spring of the counterbalancing mechanism, wherein the resilient force adjusting mechanism includes a rotating operation part, a cam coupled to the rotating operation part and slidable in association with the rotation of the rotating operation part, and a cam follower coming into contact with a cam surface of the cam, the cam follower being supported by the counterbalancing mechanism, wherein the counterbalancing mechanism is configured in such a manner that the magnitude of the resilient force to be imparted on the spring is varied depending on the position where the cam follower comes into contact with the cam.

In the tripod head of this configuration, preferably, the cam surface of the cam is a curved surface, and on the cam surface, the inclination of tangent lines drawn virtually on the curved surface from a reference position of contact with respect to the cam follower to a position corresponding to the end of the turn of the rotating operation part with respect to the sliding direction of the cam is gradually reduced.

According to the tripod head of the invention, the burden of the operator generated when a resilient force is imparted in advance on the spring provided on the counterbalancing mechanism is alleviated.

DETAILED DESCRIPTION OF THE INVENTION

Figure 1:
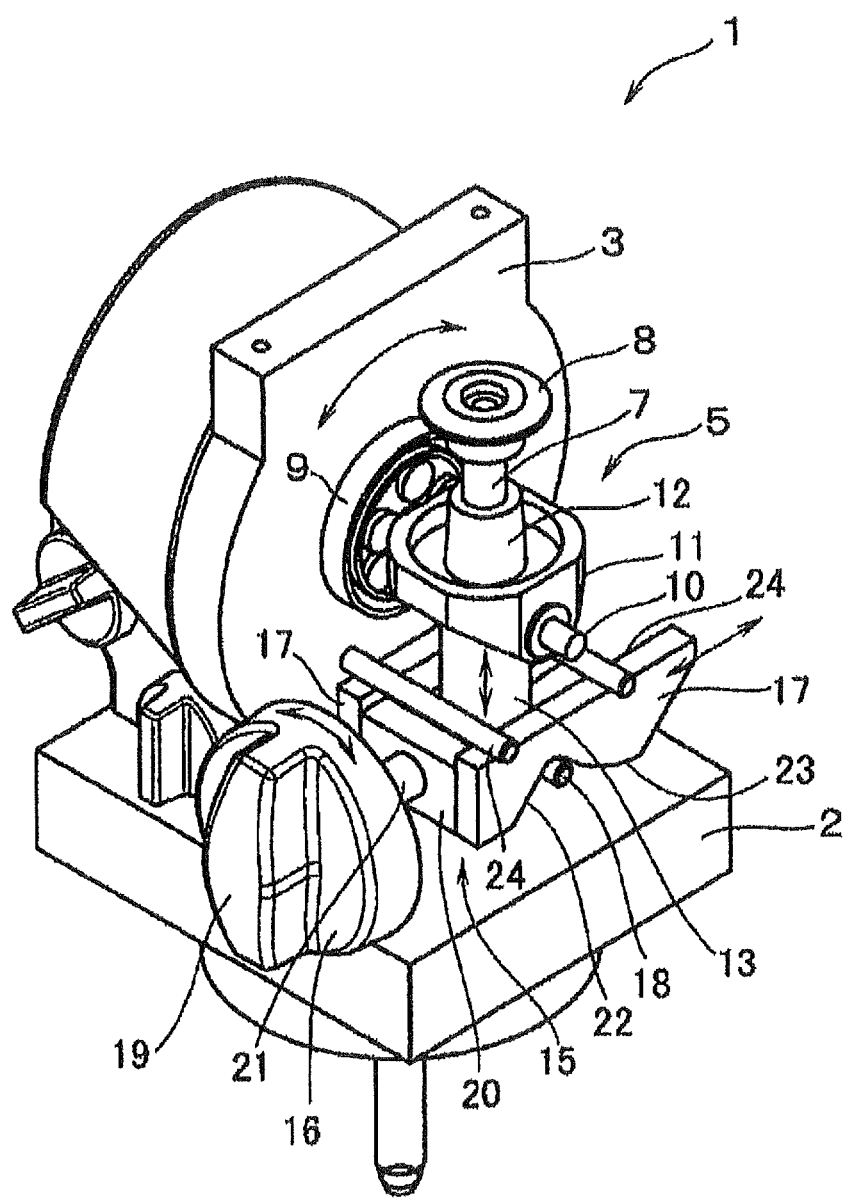
FIG. 1 is a perspective view of a principle portion showing an embodiment of a tripod head of the invention.
Figure 2:
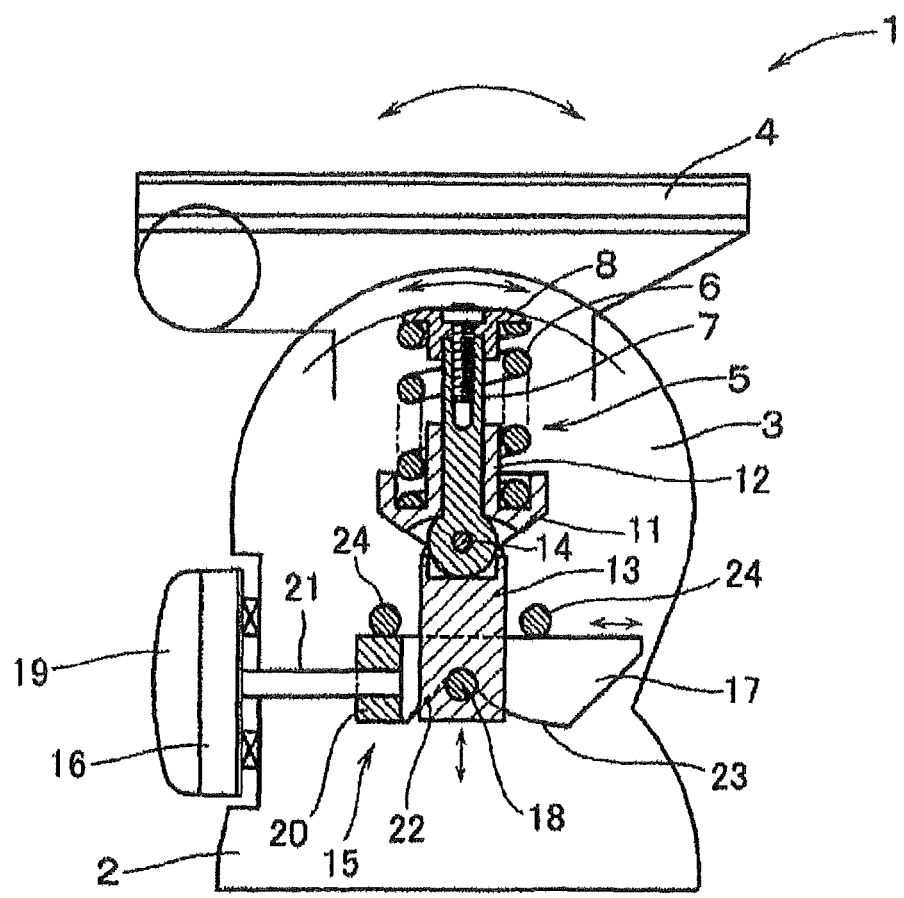
FIG. 2 is a cross-sectional view of the principal portion schematically showing a cross-section of the tripod head shown in FIG. 1.
Figure 3:
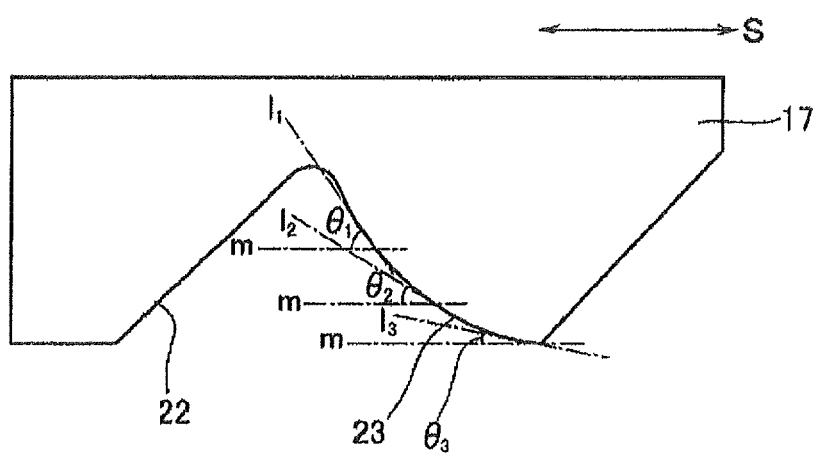
FIG. 3 is a side view of the principal potion showing a cam of the tripod head shown in FIG. 1.

FIG. 1 is a perspective view of the principle portion showing an embodiment of a tripod head of the invention. FIG. 2 is a cross-sectional view of a principal portion schematically showing a cross-section of the tripod head shown in FIG. 1.

A tripod head 1 is provided with a vertical frame 3 on a base 2 arranged horizontally. The vertical frame 3 extends vertically upward with respect to the base 2. A mounting 4 which allows mounting of a filming apparatus such as a video camera or a movie camera is supported so as to be capable of tilting in a vertical plane by the vertical frame 3. The mounting 4 is omitted from illustration in FIG. 1. A counterbalancing mechanism 5 is provided so as to be capable of tilting within the vertical plane relatively with respect to the mounting 4 and is supported by the vertical frame 3. In other words, the counterbalancing mechanism 5 is configured to tilt in a direction opposite from the direction of tilting motion of the mounting 4.

The counterbalancing mechanism 5 is provided with a spring 6 as illustrated in FIG. 2. The spring 6 is omitted from illustration in FIG. 1. The spring 6 is arranged on an outer periphery of a central axis 7 arranged in the vertical direction. The spring 6 is provided between an end cap 8 fixed to an upper end of the central axis 7 by screwing and a seat 11 rotatably supported by a bearing 9 shown in FIG. 1 provided on a side surface portion of the vertical frame 3 via a pin 10, and is expandable between the end cap 8 and the seat 11. As shown in FIG. 1, the pin 10 projects outward and sideward of the seat 11. The spring 6 generates a resilient force by its own expansion and contraction and the resilient force acts so as to be capable of counterbalancing with a rotation moment generated when the filming apparatus tilts. The counterbalancing mechanism 5 tilts within the vertical plane smoothly because the pin 10 is rotatably supported by the bearing 9.

The central axis 7 penetrates the center portion of the seat 11 in the vertical direction, and is capable of sliding vertically with respect to the seat 11. The seat 11 is integrally provided at a central portion thereof with a cylindrical portion 12 projecting upward, and the central axis 7 penetrates in the cylindrical portion 12 in the vertical direction, and a slide of the central axis 7 is guided by the cylindrical portion 12.

The counterbalancing mechanism 5 includes a supporting shaft 13 coupled to a lower end of the central axis 7 via a pin 14 as shown in FIG. 2, and the supporting shaft 13 extends downward of the central axis 7. When the supporting shaft 13 moves downward, the central axis 7 slides downward, and the distance between the end cap 8 and the seat 11 is shortened and the spring 6 is contracted. In contrast, when the supporting shaft 13 moves upward, the central axis 7 slides upward, and the distance between the end cap 8 and the seat 11 is elongated and the spring 6 is restored to its original length.

The tripod head 1 is also provided with a resilient force adjusting mechanism 15 configured to impart a resilient force in advance to the spring 6 of the counterbalancing mechanism 5. The resilient force adjusting mechanism 15 include a rotating operation part 16, cams 17, and a cam follower 18. The rotating operation part 16 is arranged on the outside of a casing (not illustrated) which form an outer shell of the tripod head 1, and includes a grip 19 which the operator of the filming apparatus may hold with his or her fingers. The grip 19 is provided so as to project outward of the rotating operation part 16. The rotating operation part 16 as described above is rotatable in both left and right directions.

A pair of left and right cams 17 are provided, and is coupled by a coupling portion 20 at ends located on the side of the rotating operation part 16. The coupling portion 20 is formed with a female screw at a center portion thereof. A male screw 21 provided so as to project rearward from a back surface of the rotating operation part 16 is screwed in the female screw. Each of the cams 17 is cut out on a lower surface located on the side of the rotating operation part 16 to be formed with a notched portion 22 and is formed with a cam surface 23 on a lower surface thereof opposite the rotating operation part 16 from an upper end of the notched portion 22. The cam surface 23 has a curved surface projecting downward and extends gradually downward. The cams 17 are attracted toward the rotating operation part 16 when the rotating operation part 16 is rotated and the male screw 21 proceeds into the female screw of the coupling portion 20. When the rotating operation part 16 is rotated in the reverse direction and the male screw 21 is moved apart from the female screw of the coupling portion 20, the cams 17 move away from the rotating operation part 16. The movement of the cams 17 as described above is realized as a horizontal sliding movement. In order to further ensure the horizontal sliding movement of the cams 17, the resilient force adjusting mechanism 15 is provided with guide pins 24 on each of the front and the back thereof in the direction of the sliding movement of the cams 17. Each of the guide pins 24 is a column-shaped pin, and is arranged in the vertical direction with respect to the side surface of the vertical frame 3, and is in contact with upper end surfaces of the left and right cams 17. The upper end surfaces of the cams 17 have a flat shape. Each of the guide pins 24 is provided with a bush (not illustrated) at connecting portions with respect to the vertical frame 3 and is configured to be rotatable. The cams 17 slide horizontally by being guided by the guide pins 24.

The cam follower 18 is the column-shaped pin, and penetrates a lower end portion of the supporting shaft 13 provided on the counterbalancing mechanism 5, and is supported by the supporting shaft 13. The cam follower 18 is arranged in parallel to the guide pins 24, and is in contact with the cam surface 23 of the cams 17. The cam follower 18 is the column-shaped pin, and hence the contact with the cam surfaces 23 is smooth. The reference positions of the cam follower 18 are apexes of the notched portions 22 of the cams 17. Since the cam surfaces 23 each have a curved surface projecting downward and extending gradually downward as described above, when the cams 17 are attracted toward the rotating operation part 16 by the rotating operation of the rotating operation part 16, the cam follower 18 moves downward along the cam surfaces 23. By the downward movement of the cam follower 18, the supporting shaft 13 provided on the counterbalancing mechanism 5 is moved downward, and hence the central axis 7 slides downward. Therefore, the spring 6 is compressed between the end cap 8 and the seat 11, and a resilient force is provided in the spring 6. When the cam follower 18 moves further downward along the cam surfaces 23, the spring 6 is further compressed, and the resilient force imparted to the spring 6 is gradually increased. In contrast, the rotating operation part 16 is rotated reversely, the cams 17 slide away from the rotating operation part 16. Therefore, the cam follower 18 moves upward along the cam surfaces 23. The supporting shaft 13 provided on the counterbalancing mechanism 5 is pressed upward, the central axis 7 slides upward, and compression of the spring 6 is gradually released. Then, at the reference position of the cam follower 18, the spring 6 is restored to its original state.

In this manner, in the counterbalancing mechanism 5, the magnitude of the resilient force imparted on the spring 6 varies depending on the position where the cam follower 18 comes into contact with the cams 17. The resilient force in accordance with the weight of the filming apparatus to be mounted on the mounting 4 may be imparted in advance on the spring 6. In addition, the magnitude of the resilient force is adjusted by the resilient force adjusting mechanism 15 provided with the cams 17 and the cam follower 18, and hence the operating force from the beginning to the end of turning operation of the rotating operation part 16 may be substantially constant, so that heavy filming apparatuses are easily accommodated. Also, the amount of rotation of the rotating operation part 16 is not too large. Therefore, the burden of the operator generated when imparting the resilient force in advance on the spring 6 provided on the counterbalancing mechanism 5 is alleviated.

On the cam surface 23 of the cam 17, from a reference position of contact with the cam follower 18 to a position corresponding to the end of the turn of the rotating operation part 16 shown in FIG. 2, the inclination of tangent lines drawn virtually on the curved surface with respect to a sliding direction S of the cam is gradually reduced. In other words, when tangent lines drawn virtually on the curved surface on the side closer to the reference position of the contact with respect to the cam follower 18, a substantially intermediate position on the cam surfaces 23, and at the position corresponding to the end of rotation of the rotating operation part 16 are defined as l1, l2, and l3, there is a relationship $\theta_1 > \theta_2 > \theta_3$ between the tangent lines l1, l2, and l3 and the angles $\theta_1, \theta_2,$ and $\theta_3$ formed with respect to the straight lines m parallel to the sliding direction S of the cam 17. In this manner, on the cam surface 23 of the cam 17 from a reference position of contact outside the cam follower 18 to a position corresponding to the end of the turn of the rotating operation part 16, the inclination of tangent lines drawn virtually on the curved surface with respect to the sliding direction S of the cam 17 is gradually reduced. Therefore, the force required for the rotating operation of the rotating operation part 16 is gradually reduced as it approaches the end of the turn, and the heavy filming apparatuses are accommodated more easily.

The tripod head of the invention is not limited to the embodiments described above. Detailed parts of the mounting or the counterbalancing mechanism may be of any modes.

The invention claimed is:

1. A tripod head comprising:
   a mounting which is tiltable and allows a filming apparatus to be mounted thereon;
   a counterbalancing mechanism comprising a spring and being configured to generate a resilient force on the spring so as to counterbalance with a rotation moment generated when the filming apparatus to be mounted on the mounting tilts;
   and a resilient force adjusting mechanism configured to accommodate a weight of the filming apparatus and impart a resilient force in advance on the spring of the counterbalancing mechanism, wherein
   the resilient force adjusting mechanism includes a rotating operation part, a cam coupled in between the rotating operation part and the spring and configured to slide with a rotation of the rotating operation part, and a cam follower in contact with a cam surface of the cam, the cam follower being supported by the counterbalancing mechanism, and
   the counterbalancing mechanism is configured in such a manner that a magnitude of the resilient force imparted on the spring varies depending on the position where the cam follower contacts the cam.

2. The tripod head according to claim 1, wherein the cam surface of the cam is a curved surface, and on the cam surface, an inclination of tangent lines drawn virtually on the curved surface from a reference position of contact with respect to the cam follower to a position corresponding to an end of a turn of the rotating operation part with respect to a sliding direction of the cam is gradually reduced.

3. The tripod head according to claim 1, wherein the rotating operation part, the cam and the spring are configured and arranged such that the rotation of the rotating operation part directly causes the cam to slide which, in turn, imparts the resilient force on the spring.

4. The tripod head according to claim 1, further comprising a coupling portion; and
   a projection disposed on the rotating operation part;
   wherein the cam is fived to the coupling portion and the rotation of the rotating operation part rotates the projection within threads of the coupling portion which directly causes the cam to slide.

5. The tripod head according to claim 4, wherein the cam is a first cam fixed to a first side of the coupling portion, and a second cam is fived to a second side of the coupling portion.

6. The tripod head according to claim 1, wherein the cam is configured to slide linearly.

7. The tripod head according to claim 1, further comprising a guide pin configured to guide a linear sliding movement of the cam.

* * * * *